Patented Jan. 1, 1946

2,392,153

UNITED STATES PATENT OFFICE 2,392,153

PRODUCTION OF BASIC ALUMINUM CHLORIDE

Ernest H. Kastning, Mamaroneck, N. Y., assignor to William R. Warner & Co. Inc., New York, N. Y., a corporation of Delaware No Drawing. Application December 31, 1943, Serial No. 516,539

6 Claims. (Cl. 23—92)

The present invention relates to the production of basic aluminum chloride. More particularly, it relates to the production of basic aluminum chloride which is particularly adapted for use as a body deodorant.

Normal aluminum chloride is much used as an astringent type of body deodorant, but because of its unusually high acidity it is harmful to clothing, particularly highly colored types, with the result that users of such products must exercise unusual care to remove all surplus liquid from the body before dressing in order to avoid damage to clothing. Attempts have been made to remedy this situation by reducing the acidity of the normal aluminum chloride solution by converting it to the basic salt aluminum hydroxy chloride. However, known methods for the production of this salt have been very slow and have invariably resulted in a very impure product, which has not only increased the cost of the final solution but has resulted in an impure solution.

It is an object of the present invention to provide a process of producing basic aluminum chloride salt which overcomes all of the foregoing deficiencies.

It is another object of the present invention to provide a process of producing basic aluminum chloride salt which has an unusually high degree of purity.

It is a still further object of the present invention to provide a process of producing basic aluminum chloride salt at a rapid rate and under conditions which are otherwise economical.

Other objects and advantages of the invention, if not specifically pointed out, will be apparent to those skilled in the art from the following detailed description of what is now considered to be a preferred embodiment of the invention.

The process of the invention in general comprises reacting a freshly prepared wet aluminum hydroxide gel with an aqueous aluminum chloride solution to produce a basic aluminum hydroxide.

The invention accordingly comprises the several steps and the relation of one or more of such steps with respect to each of the others thereof, which will be exemplified in the process hereinafter disclosed, and the scope of the invention will be indicated in the claims.

The process of the present invention is preferably carried out by dissolving aluminum chloride crystals in water, heating the aluminum chloride solution so formed to approximately 75° C., and then treating the heated solution with ammonium hydroxide until the resulting product is slightly alkaline to litmus. The mixture is then stirred at 75° C. for approximately one hour at which time the aluminum hydroxide so formed is filtered off and washed free from chlorides, such as ammonium chloride. The existence of ammonium chloride in the aluminum hydroxide would result in the production of aluminum oxides which would be insoluble in the solution and produce a milky and unsightly solution.

The moist, washed aluminum hydroxide gel is then introduced into an aluminum chloride solution, heated to approximately 90° C., and the heating continued with stirring until the solution clears, which will occur in approximately fifteen hours. The aluminum hydroxide is preferably in excess in this step and the excess aluminum hydroxide after the completion of the step is filtered off and reused. The solution is then cooled to approximately 25° C. and sufficient water added to adjust the specific gravity of the solution to 1.26 at 25° C. Under these conditions the resulting solution will be found to have a pH of 1.8. Control of the hydrogen ion concentration to approximately this value eliminates substantially all free aluminum chloride from the solution in the combined form of the basic salt. The solute of the solution consists of substantially pure basic aluminum chloride which can be used in desired concentration as an astringent to act as a body deodorant.

By way of explanation of the invention, and not in limitation thereof, the following specific examples of a process of the invention will be given:

Example #1

200 lbs. of aluminum chloride crystals ($AlCl_3 \cdot 6H_2O$) are dissolved in 80 gallons of water, heated to 75° C. and then treated with ammonium hydroxide until very slightly alkaline to litmus. This mixture is heated and stirred at 75° C. for 1 hr. The aluminum hydroxide is filtered off and washed until free from chlorides.

All of this moist washed precipitate is introduced into an aluminum chloride solution made by dissolving 414 lbs. of aluminum chloride crystals ($AlCl_3 \cdot 6H_2O$) in 88 gals. of water at 90° C. This solution is heated and stirred at 90° C. until it clears. This takes about 15 hours. The solution is then cooled to 25° C. and sufficient water added to bring the specific gravity to 1.26 at 25° C. The resulting solution will have a pH of 1.8.

Example #2

An excess of the moist aluminum hydroxide as prepared in Example #1 is added to an aluminum chloride solution at 90° C. and stirred until a filtered sample shows a pH of 1.8 and specific gravity at 25° C. of 1.26. The mixture is cooled rapidly and filtered with the aid of any suitable filter media.

At least sufficient aluminum hydroxide gel is added to substantially react with the aluminum chloride in solution so as to reduce the acidity in the final product. The quantities of aluminum hydroxide gel and aluminum chloride and the conditions of reaction are such that the basic aluminum chloride having the formula $Al_2Cl_4(OH)_2$ is formed.

Since certain changes may be made in carrying out the above process without departing from the scope of the invention, it is intended that all matter contained in the above description shall be interpreted as illustrative and not in a limiting sense.

The invention having been described, what is claimed is:

1. The process of producing a basic aluminum chloride having the formula $Al_2Cl_4(OH)_2$ which comprises dissolving aluminum chloride crystals in water, heating the aqueous aluminum chloride solution so formed to approximately 75° C., treating the heated aluminum chloride solution with ammonium hydroxide until the resulting solution is slightly alkaline to litmus, continuing the heating with vigorous stirring at approximately 90° C. for approximately one hour, filtering off the aluminum hydroxide gel so formed, washing the filtered aluminum hydroxide gel free of chlorides and other impurities, introducing the purified aluminum hydroxide gel into an aluminum chloride solution heated to approximately 90° C., continuing the heating with stirring until the solution clears, cooling the solution to approximately 75° C., and adding sufficient water to the solution to adjust the specific gravity to 1.26 at 25° C.

2. The process of producing basic aluminum chloride having the formula $Al_2Cl_4(OH)_2$ which comprises reacting a purified, freshly prepared, wet aluminum hydroxide gel with an aluminum chloride solution heating to approximately 90° C., continuing the heating at that temperature while stirring until the solution reaches a pH of about 1.8, cooling the solution to approximately 25° C. and adding sufficient water to adjust the specific gravity to 1.26 at 25° C.

3. The process of producing a basic aluminum chloride composition suitable for use as a body deodorant which comprises adding at least the molecular equivalent amount of chloride free aluminum hydroxide gel to a solution of normal aluminum chloride for the formation of the basic salt having the formula $Al_2Cl_4(OH)_2$ and agitating the mixture at a relatively high temperature for a sufficient time until the pH of the solution is approximately 1.8 when the gravity is adjusted to about 1.26 at 25° C. and the solute of the solution consists of the substantially pure basic aluminum chloride.

4. The process of producing a basic aluminum chloride composition suitable for use as a body deodorant which comprises adding an excess of an aluminum hydroxide gel over that required to form the basic salt having the formula $$Al_2Cl_4(OH)_2$$

to a solution of normal aluminum chloride, agitating the mixture at a temperature of approximately 90° C. for a sufficient time until the pH of the solution is approximately 1.8 when the gravity is adjusted to about 1.26 at 25° C. and the solute of the solution consists of the substantially pure basic aluminum chloride and then filtering off the excess gel.

5. The process of producing a basic aluminum chloride composition suitable for use as a body deodorant which comprises adding substantially the molecular equivalent amount of chloride free aluminum hydroxide gel to a solution of normal aluminum chloride for the formation of the basic salt $Al_2Cl_4(OH)_2$ and agitating the mixture at a temperature of approximately 90° C. for a sufficient time until the pH of the solution is approximately 1.8 when the gravity is adjusted to about 1.26 at 25° C. and the solute of the solution consists of the substantially pure basic aluminum chloride.

6. The process of producing a basic aluminum chloride composition suitable for the use as a body deodorant which comprises adding at least a molecular equivalent of chloride free aluminum hydroxide gel to a solution of normal aluminum chloride to form the basic salt $Al_2Cl_4(OH)_2$ and agitating the mixture at a temperature of approximately 90° C. for a period of about fifteen hours.

ERNEST H. KASTNING.